United States Patent [19]

Brizgys

[11] 4,438,235

[45] Mar. 20, 1984

[54] TERTIARY ALKANOLAMINES TO INCREASE VISCOSITY OF FILLED LIQUID POLYMERS

[75] Inventor: Bernardas Brizgys, Southgate, Mich.

[73] Assignee: BASF Wyandotte Corporation, Wyandotte, Mich.

[21] Appl. No.: 430,153

[22] Filed: Sep. 30, 1982

[51] Int. Cl.³ .............................................. C08L 75/08
[52] U.S. Cl. .................................... 524/700; 252/182; 524/786; 524/788; 524/791; 528/49; 528/55; 528/56; 528/57; 528/77; 528/79; 528/81; 528/83; 528/84; 528/85

[58] Field of Search .................... 252/182; 528/49, 56, 528/57, 55, 77, 79, 80, 81, 83, 84, 85; 524/700, 786, 788, 791

[56] References Cited

U.S. PATENT DOCUMENTS 4,217,422  8/1980  Wasilczyk ........................... 252/182
4,304,708  12/1981  Marx et al. .......................... 252/182

*Primary Examiner*—Maurice J. Welsh
*Attorney, Agent, or Firm*—Norbert M. Lisicki

[57] ABSTRACT

Filled liquid, polyhydroxyl-containing polymers such as polyether and polyester polyols can be increased in viscosity by incorporating therein a tertiary alkanol monoamine.

12 Claims, No Drawings

TERTIARY ALKANOLAMINES TO INCREASE VISCOSITY OF FILLED LIQUID POLYMERS

BACKGROUND OF THE INVENTION

1. Field of the Invention

This invention relates to thickened liquid polymers containing at least two active hydrogen atoms per molecule wherein said polymers are thickened utilizing a combination of an inorganic filler and a tertiary alkanol monoamine.

2. Description of the Prior Art

Inorganic materials have long been used as fillers, pigments, reinforcements, and chemical reactants in liquid polymer mixtures. Many of the inorganic fillers are hydrophilic, that is, they are easily wetted by water and also may absorb water. Their compatibility with polymers is generally limited and, therefore, relatively poor utilization is obtained of the potential reinforcement, color, opacity, or chemical reactivity possible with such inorganic fillers, pigments, and reinforcing agents.

It has been proposed to employ surface active agents to facilitate the incorporation of inorganic materials into liquid polymers. The known surface active agents have many shortcomings when utilized for this purpose. For instance, many surface active agents utilized to disperse inorganic fillers in liquid polymers provide poor shelf stability of the mixture as well as limited ability to completely disperse large amounts of filler materials in the liquid polymers.

The compositions of the present invention provide a means of increasing the viscosity of filled liquid polymers so as to provide improved stability of the mixture of liquid polymer and filler. By the process of the invention, large amounts of filler are easily dispersed in liquid polymers without substantial phase separation.

SUMMARY OF THE INVENTION

It is an object of this invention to provide high viscosity, stable mixtures of an inorganic filler and a liquid organic polymer containing at least two active hydrogen atoms, as determined by the Zerewitinoff Method. The thickened, filled liquid polymers are useful in the preparation of polyurethanes by the reaction of an organic polyisocyanate with said liquid polymer in the presence of a catalyst for the reaction. The thickened mixtures of filler and said liquid polymer are obtained by the process of incorporating into said liquid polymer an effective viscosity increasing amount of a branched or straight chain, mixed alkyl alkanol, tertiary monoamine or a tertiary alkanol monoamine. Preferably said alkanolamine is selected from the group consisting of at least one of a dialkyl alkanolamine, an alkyl dialkanolamine, and a trialkanolamine.

DESCRIPTION OF THE PREFERRED EMBODIMENTS

It has been found, in accordance with the present invention, that liquid polymers containing inorganic fillers, pigments, and generally any fine particle size particulate inorganic materials which are incompatible with liquid polymers, can be thickened by incorporating therein an alkanol tertiary monoamine in an effective viscosity increasing amount. The tertiary alkanolamines include both branched and straight chain alkyl dialkanol tertiary amines dialkyl monoalkanol tertiary amines, trialkanol tertiary amines and mixtures thereof.

The tertiary alkanolamines utilized in the compositions of the invention generally have 2 to about 8 carbon atoms, preferably 2 to about 5 carbon atoms, and most preferably 2 to about 3 carbon atoms, in each alkanol or alkyl group attached to nitrogen.

The inorganic fillers which can be utilized in admixture with the liquid polymers include any inorganic fine particle size particulate materials which are desired to be incorporated into liquid polymer compositions and which are incompatible therewith. The useful inorganic pigments and fillers include calcium carbonate, hydrated aluminum silicate, hydrated magnesium silicate, titanium dioxide and various inorganic pigments to provide color to coatings prepared utilizing the liquid polymer composition.

The mixture of an inorganic filler and a liquid polymer can be used together with an organic polyisocyanate and optionally a catalyst for the reaction of an isocyanate and a liquid polymer having active hydrogen groups to prepare a curable mixture useful in the preparation of a polyurethane. Where a tertiary alkanol monoamine, as defined above, is present as a component of said mixture in an effective viscosity increasing amount, the homogenuity of the polyurethane product obtained is increased. This is the result of a reduction in phase separation which would normally occur between the liquid polymer and the inorganic filler. It will thus be appreciated by those skilled in the art that increasing the viscosity of such a curable mixture can be highly advantageous to the production of uniform and homogeneous polyurethane products.

Representative examples of useful tertiary alkanol monoamines include triethanolamine, triisopropanolamine, N-methyl diethanolamine, N,N-diisopropyl ethanolamine, N,N-diethyl ethanolamine, N,N-dimethyl ethanolamine, N-ethyl diethanolamine, N-butyl diethanolamine, and 5-diethylamino-2-pentanol, dibutylaminoethanol, disec-butylaminoethanol, diisobutylaminoethanol, diisopentylaminoethanol, dihexylaminoethanol, isobutyl diisopropylmethanol, dioctylaminoethanol, diethylaminobutanol, dipropylaminobutanol, dibutylaminobutanol, diisobutylaminobutanol, and diethanol isopropylamine.

The proportion of inorganic filler which can be utilized in admixture with the liquid polymers described above is generally about 5 to about 50 percent by weight based upon the weight of said liquid polymers, preferably about 10 to about 45 percent by weight, and most preferably, about 20 to about 40 percent by weight, all based upon the weight of the liquid polymer utilized in the mixture. The alkanolamine is utilized in an effective viscosity increasing amount in admixture with the inorganic filler and liquid polymer. Generally, about 0.1 percent to about 2 percent by weight based upon the weight of the inorganic filler, preferably about 0.2 percent to about 1 percent by weight, and most preferably about 0.2 to about 0.5 percent by weight, all based upon the weight of the inorganic filler, is utilized in said mixture.

The polyurethanes prepared by the process of the present invention generally comprise the reaction product of an organic polyisocyanate and a liquid organic polyol. If it is desired to prepare a non-cellular polyurethane coating, then in addition to the above-mentioned materials, generally a filler and optionally a colored pigment as well as a curing agent can be employed. If it is desired to prepare a polyurethane foam, then, in addition to said polyisocyanate and polyol, a blowing agent and a foam stabilizer are generally employed. It is to be understood that the particular adjuncts employed in the preparation of polyurethane reaction products are well known in the art and their use varies according to the products desired. By way of example, the ratio of isocyanate groups to hydroxyl groups in the solid and foamed polyurethanes produced using the co-catalysts of the invention can be generally 0.9:1.0 to about 1.5:1.0, preferably about 1.05:1.0 to about 1.2:1.0, and most preferably about 1.05:1.0 or, approximately a stoichiometric amount of each of said reactants.

Illustrative organic polyisocyanates which can be employed in accordance with the present invention include aromatic, aliphatic, and cycloaliphatic polyisocyanates and combinations thereof. Representative of these types are the diisocyanates such as m-phenylene diisocyanate, tolylene-2, 4-diisocyanate, tolylene-2,6-diisocyanate, mixtures of 2,4- and 2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3''-dimethoxy-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate, and tolylene 2,4,6-triisocyanate; and the tetraisocyanates such as 4,4'-dimethyldiphenylmethane 2,2',5,5'-tetraisocyanate. Especially useful because of their availability and properties are tolylene diisocyanate, diphenylmethane-4,4'-diisocyanate, and polymethylene polyphenylisocyanate.

Crude polyisocyanate can also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,251,652, incorporated herein by reference.

As used in the present invention, the terms "organic polyisocyanate" also include isocyanate-terminated polyurethane prepolymers which are prepared by the reaction of an excess amount of any of the above-mentioned organic polyisocyanates with an organic polyol. Any of the organic polyols discussed below can be used.

Representative of the organic polyols which can be employed as liquid polymer reactants in the preparation of polyurethanes by the process of the invention are those polyols having molecular weights generally of about 100 to about 2000, preferably about 200 to about 1000, and most preferably about 400 to about 800. These liquid polyols have at least two active hydrogen atoms. The term "active hydrogen atoms" refers to hydrogen atoms which, because of their position in the molecule, display activity according to the Zerewitinoff test as described by Kohler in *J. Am. Chem. Soc.*, 49, 3181 (1927). Representative useful organic polyols include polyhydroxyl-containing polyesters, polyalkylene polyether polyols, polyhydroxy-terminated polyurethane polymers, and polyhydroxyl-containing phosphorus compounds. Aliphatic polyalkylene polyether or polyester polyols including alkylene oxide adducts of polyhydric alcohols, polythioethers, polyacetals, and aliphatic thiols are preferred. Alkylene oxide adducts of compounds which contain two or more different groups within the above-defined classes can also be used such as amino alcohols which contain an amino group and a hydroxyl group. Also alkylene oxide adducts of compounds which contain one —SH group and one —OH group as well as those which contain an amino group and a —SH group can be used. Preferably, the liquid polymer used in the preparation of the filled compositions of the invention are polyalkylene polyether or polyalkylene polyester polyols. Most preferably, said liquid polymer is a polyether polyol.

Any suitable polyhydroxyl-containing polyester can be used as a reactant in the preparation of poyurethanes by the process of the invention such as are obtained from the reaction of polycarboxylic acids and polyhydric alcohols. Any suitable polycarboxylic acid or anhydride can be used to prepare said polyester such as oxalic acid, malonic acid, succinic acid, glutaric acid, adipic acid, pimelic acid, suberic acid, azelaic acid, sebacic acid, maleic acid, fumaric acid, glutaconic acid, α-hydromuconic acid, β-hydromuconic acid, α-butyl-α-ethyl-glutaric acid, α,β-diethylsuccinic acid, phthalic acid, isophthalic acid, terephthalic acid, hemimellitic acid, trimesic acid, succinic anhydride, maleic anhydride, and phthalic anhydride.

Any suitable polyhydric alcohol including both aliphatic and aromatic can be used to prepare said polyhydroxyl-containing polyester such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, a-methyl glucoside, pentaerythritol, and sorbitol. Also included with the term "polyhydric alcohol" are compounds derived from phenol such as 2,2-bis(4,4'-hydroxyphenyl)propane, commonly known as Bisphenol A.

Any suitable polyalkylene polyether polyol can be used as a reactant in the preparation of polyurethanes by the process of the invention such as the polymerization product of an alkylene oxide or of an alkylene oxide with a polyhydric alcohol. Any suitable polyhydric alcohol can be used to prepare said polyether polyol such as those disclosed above for use in the preparation of the hydroxyl-containing polyesters (polyester polyols). Any suitable alkylene oxide can be used to prepare said polyether polyol such as ethylene oxide, propylene oxide, butylene oxide, amylene oxide, and heteric or block copolymers of these oxides. The polyalkylene polyether polyols can be prepared using other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols can have either primary or secondary hydroxyl groups and, preferably, are polyethers prepared from at least one lower alkylene oxide having 2 to 6 carbon atoms. Representative examples of polyalkylene polyether polyols are polyethylene ether glycols, polypropylene ether glycols, and polybutylene ether glycols. Polyethers which are preferred include the lower alkylene oxide addition products of trimethylolpropane, glycerine, pentaerythritol, sucrose, sorbitol, propylene glycol, and 2,2-bis(4,4'-hydroxyphenyl)propane and blends thereof having equivalent weights of from 250 to 5000. The polyalkylene polyether polyols can be prepared by any known process such as, for example, the process disclosed by Wurtz in 1859 or the process disclosed in the Encyclopedia of Chemical Technology, vol. 7, pp. 257-262, published by Interscience Publishers, Inc. (1951) or in U.S. Pat. No. 1,922,459.

Suitable polyhydric polythioethers which can be condensed with alkylene oxides include the condensation product of thiodiglycol or the reaction product of a dihydric alcohol such as disclosed above for the preparation of the hydroxyl-containing polyesters with any other suitable thioether glycol.

The polyhydroxyl-containing polyester can also be a polyester amide such as is obtained by including some amine or amino alcohol in the reactants for the preparation of the polyesters. Polyester amides can be obtained by condensing an amino alcohol such as ethanolamine with the polycarboxylic acids set forth above or they can be made using the same components that make up the hydroxy-containing polyester with only a portion of the components being a diamine such as ethylene diamine.

Suitable polyacetals which can be condensed with alkylene oxides include the reaction product of formaldehyde or other suitable aldehyde with a dihydric alcohol or an alkylene oxide such as those disclosed above.

Suitable aliphatic thiols which can be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting one mole of an isocyanate with several moles of an alkylene glycol. The above-described polyols used in the invention can be used alone or in mixtures.

The use of filled liquid organic polymer compositions is particularly applicable to the preparation of solid, non-cellular polyurethanes, particularly rubber or elastomer types of polyurethane prepared by reacting liquid mixtures of organic polyisocyanates and liquid organic polymers containing at least two active hydrogen atoms such as hydroxy-terminated polyols. The use of organo-mercuric compound catalysts together with the tertiary amine compounds of the invention is preferred in the preparation of solid, non-cellular polyurethanes. Curable compositions comprise an organic polyisocyanate and a filled liquid polymer, as previously described, wherein said liquid polymer contains an inorganic filler and an effective viscosity increasing amount of a tertiary alkanol monoamine. The useful organo-mercuric compounds are characterized as ionizable organo-mercuric compounds. Among this group of organo-mercuric compound catalysts are the organo-mercuric acetate, propionate, borate, benzoate, methacrylate, hydroxide, phthalate, gluconate, salicylate, octoate, stearate, etc. The organo substituent can be an open or closed chain organic radical which is inert to isocyanate-active hydrogen reactions, as for example, an aryl or alkyl group. Other organo-mercuric compounds which are useful are the organo-mercuric substituted ammonium salts, such as di-(phenyl-mercuric) substituted ammonium phenate, glycolate, benzene sulfonate, maleate, etc.

The following examples illustrate the various aspects of the invention but are not intended to limit its scope.

Where not otherwise specified throughout this specification and claims, temperatures are given in degrees centigrade and parts, percentages and proportions are by weight.

EXAMPLE 1

(Comparative example-forming no part of this invention)

A filled mixture containing a liquid polymer diol was prepared in the following manner. To a container there were charged 545 parts by weight of a 2000 molecular weight liquid polymer diol based upon 1,2-propylene oxide and propylene glycol, 253 parts by weight of talc (hydrated magnesium silicate), and 4 parts by weight of yellow iron oxide together with 1.2 parts by weight of mercury propionate containing 45 percent by weight mercury. These materials were thoroughly mixed using a high shear laboratory mixer. Viscosity data are shown in Table I.

EXAMPLE 2

Example 1 was repeated except that, in addition to the components utilized in Example 1, there were added 3.3 parts by weight of triethanolamine. Viscosity data are shown in Table I.

EXAMPLE 3

Example 1 was repeated except that in addition to the ingredients utilized therein there were added 2.0 parts by weight of dimethyl ethanolamine. Viscosity data are shown in Table I.

EXAMPLE 4

(Comparative example-forming no part of this invention)

A filled mixture containing a liquid polymer diol was prepared in the following manner: To a container there were charged 545 parts by weight of a 2000 molecular weight liquid polymer diol based upon propylene oxide and propylene glycol, 253 parts of a calcined clay (aluminum silicate sold under the trademark "SATINTONE No. 2," 4 parts by weight of yellow iron oxide together with 1.2 parts by weight of mercury propionate containing 45 percent by weight mercury. These materials were thoroughly mixed using a high shear laboratory mixer. Viscosity data are shown in Table I.

EXAMPLE 5

Example 4 was repeated except that in addition to the components utilized in Example 3 there were added 3.3 parts by weight of triethanolamine. Viscosity data are shown in Table I.

EXAMPLE 6

(Comparative example-forming no part of this invention)

A curable mixture containing an inorganic filler and a liquid polymer diol useful in the preparation of a polyurethane sealant is prepared in the following manner: To a container, charge 545 parts by weight of a 2000 molecular weight liquid polymer diol based upon 1,2-propylene oxide and propylene glycol, 253 parts by weight of a calcined clay sold under the trademark "SATINTONE No. 2," and 4 parts by weight of yellow iron oxide together with 1.2 parts by weight of mercury propionate containing 45 percent by weight mercury. These materials are thoroughly mixed using a high shear laboratory mixer to prepare a filled liquid polyol mixture.

In a second container, there is added 25.3 parts by weight of an aromatic polyisocyanate prepared by mixing equal parts by weight of crude methylene diisocyanate and a toluene diisocyanate quasi-prepolymer prepared by mixing 20 to 30 percent by weight of a crude diphenyl methane, 4,4'-diisocyanate with 80 to 70 percent by weight of a toluene diisocyanate quasi-prepolymer having 23 to 27 percent by weight free isocyanate and sold under the tradename "MONDUR-425." There is then added 200 parts by weight of the filled polyol mixture prepared as indicated above and after thoroughly mixing the ingredients, the composition is coated onto a flat surface and allowed to cure.

EXAMPLE 7

Example 6 is repeated except that 3.3 parts by weight of triethanolamine are added to the liquid polymer diol prior to high shear mixing to incorporate the filler.

EXAMPLE 8

Example 6 is repeated except that 2.0 parts by weight of dimethyl ethanolamine are added to the liquid polymer diol prior to high shear mixing to incorporate the filler.

TABLE I

Viscosity of Filled Liquid Polymer Diols
Brookfield Viscosity (cps)

| | Examples | | | | |
|---|---|---|---|---|---|
| | 1 | 2 | 3 | 4 | 5 |
| Spindle No. 6 @ 25° C. (rpm) | | | | | |
| 2.5 | — | — | — | 98,000 | 234,000 |
| 5.0 | — | — | — | 58,000 | 129,000 |
| 10.0 | — | — | — | 35,000 | 73,000 |
| 20.0 | — | — | — | 22,250 | 42,500 |
| Spindle No. 4 of No. 5 @ 25° C. (rpm) | | | | | |
| 2.5 | 4,400 | 53,800 | 12,400 | — | — |
| 5.0 | 2,800 | 38,000 | 7,800 | — | — |
| 10.0 | 2,300 | 18,200 | 4,900 | — | — |
| 20.0 | 1,800 | 11,100 | 3,200 | — | — |

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The embodiments of the invention in which an exclusive property or priviledge is claimed are defined as follows:

1. A filled liquid polymer composition comprising a liquid polymer having a molecular weight of about 100 to about 2000 and containing at least two active hydrogen atoms as determined by the Zerewitinoff Method, an inorganic filler, selected from the group consisting of calcium carbonate, hydrated aluminum silicate, hydrated magnesium silicate and titanium dioxide, said inorganic filler present in the amount of about 5 percent by weight to about 50 percent by weight, based on the weight of said liquid polymer and a tertiary alkanolamine having in each chain 2 to about 8 carbon atoms, wherein said tertiary alkanolamine is selected from the group consisting of alkyl dialkanolamine, dialkyl alkanolamine and trialkanolamine, said tertiary amine present in the amount of 0.1 percent to about 2 percent by weight based on the weight of said inorganic filler.

2. The composition of claim 1 wherein said liquid polymer is selected from the group consisting of polyalkylene polyether polyols and polyalkylene polyester polyols and wherein said alkanolamine has in each chain 2 to about 5 carbon atoms.

3. The composition of claim 2 wherein said liquid polymer is a polyalkylene polyether polyol.

4. The composition of claim 3 wherein said tertiary alkanolamine is selected from the group consisting of at least one of triethanolamine and dimethylethanolamine.

5. The composition of claim 4 wherein said polyalkylene polyether polyol is prepared from at least one lower alkylene oxide having 2 to 6 carbon atoms.

6. The composition of claim 5 wherein said polyalkylene polyether polyol is derived from the reaction of 1,2-propylene oxide with propylene glycol and said inorganic filler is hydrated aluminum silicate.

7. The composition of claim 5 wherein said polyalkylene polyether polyol is derived from the reaction of 1,2-propylene oxide with propylene glycol and said inorganic filler is hydrated magnesium silicate.

8. A process for preparing a non-cellular polyurethane comprising reacting an organic polyisocyanate with a liquid polymer having a molecular weight of about 100 to about 2000 and containing at least two active hydrogen atoms, as determined by the Zerewitinoff Method, wherein said liquid polymer contains an inorganic filler, selected from the group consisting of calcium carbonate, hydrated aluminum silicate, hydrated magnesium silicate and titanium dioxide, said inorganic filler present in the amount of about 5 percent by weight to about 50 percent by weight, based on the weight of said liquid polymer and a tertiary alkanolamine selected from the group consisting of alkyl dialkanolamine, dialkyl alkanolamine and trialkanolamine, said tertiary amine present in the amount of 0.1 percent to about 2 percent by weight based on the weight of said inorganic filler.

9. A curable composition useful in the preparation of cellular and non-cellular polyurethanes comprising an organic polyisocyanate and a liquid polymer having a molecular weight of about 100 to about 2000 and containing at least two active hydrogen atoms per molecule, as determined by the Zerewitinoff Method, wherein said liquid polymer contains an inorganic filler selected from the group consisting of calcium carbonate, hydrated aluminum silicate, hydrated magnesium silicate and titanium dioxide, said inorganic filler present in the amount of about 5 percent by weight to about 50 percent by weight, based on the weight of said liquid polymer and a tertiary alkanolamine selected from the group consisting of alkyl dialkanolamine, dialkyl alkanolamine and trialkanolamine, said tertiary amine present in the amount of 0.1 percent to about 2 percent by weight based on the weight of said inorganic filler.

10. A process for thickening and stabilizing a mixture of an inorganic filler selected from the group consisting of calcium carbonate, hydrated aluminum silicate, hydrated magnesium silicate and titanium dioxide, said inorganic filler present in the amount of about 5 percent by weight to about 50 percent by weight, based on the weight of said liquid polymer and a liquid polymer comprising adding thereto a tertiary alkanolamine selected from the group consisting of alkyl dialkanolamine, dialkyl alkanolamine and trialkanolamine, said tertiary amine present in the amount of 0.1 percent to about 2 percent by weight based on the weight of said inorganic filler.

11. The process of claim 10 wherein said liquid polymer is a polyalkylene polyether or polyalkylene polyester polyol having a molecular weight of about 100 to about 2000.

12. The process of claim 11 wherein said tertiary alkanolamine is selected from the group consisting of triethanolamine and dimethylethanolamine.

* * * * *